US010817508B2

(12) United States Patent
Arquie et al.

(10) Patent No.: US 10,817,508 B2
(45) Date of Patent: Oct. 27, 2020

(54) TECHNIQUES FOR CONSTRUCTING AND EDITING A SEARCH QUERY USING AN OVERLOAD CELL

(75) Inventors: Louis Arquie, Cupertino, CA (US); Greg Neustaetter, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 796 days.

(21) Appl. No.: 12/966,382

(22) Filed: Dec. 13, 2010

(65) Prior Publication Data

US 2012/0150911 A1    Jun. 14, 2012

(51) Int. Cl.
| | | |
|---|---|---|
| G06F 16/242 | (2019.01) | |
| G06F 16/2453 | (2019.01) | |
| G06F 16/832 | (2019.01) | |
| G06F 3/0482 | (2013.01) | |
| G06F 16/248 | (2019.01) | |

(52) U.S. Cl.
CPC ........ *G06F 16/2428* (2019.01); *G06F 3/0482* (2013.01); *G06F 16/248* (2019.01); *G06F 16/2423* (2019.01); *G06F 16/24534* (2019.01); *G06F 16/832* (2019.01)

(58) Field of Classification Search
CPC ......... G06F 17/30103; G06F 17/30126; G06F 17/30277; G06F 17/30389; G06F 17/3064; G06F 16/2428; G06F 16/243; G06F 16/2423; G06F 16/7335; G06F 16/532; G06F 16/2455
USPC ................. 345/650, 661, 676; 707/780, 805, 707/E17.03, E17.076; 715/700–866; 716/139; 703/713, 759–760, 762, 765
See application file for complete search history.

(56) References Cited

U.S. PATENT DOCUMENTS

| | | | | | |
|---|---|---|---|---|---|
| 5,963,938 | A * | 10/1999 | Wilson | ................ | G06F 16/332 |
| 6,285,998 | B1 * | 9/2001 | Black | ................ | G06F 17/30392 |
| 7,031,960 | B1 * | 4/2006 | Costin | ................. | A61K 9/0024 707/771 |
| 7,383,513 | B2 * | 6/2008 | Goldberg | .......... | G06F 17/30398 707/999.001 |
| 7,809,714 | B1 * | 10/2010 | Smith | ............... | G06F 17/30395 707/705 |
| 8,805,875 | B1 * | 8/2014 | Bawcom | ........... | G06F 17/30424 707/718 |
| 2002/0073146 | A1 * | 6/2002 | Bauer | ................... | G06F 9/5055 709/203 |
| 2003/0172082 | A1 * | 9/2003 | Benoit et al. | ................. | 707/101 |
| 2006/0101073 | A1 * | 5/2006 | Popa | ................. | G06F 17/30914 |

(Continued)

*Primary Examiner* — Tamara T Kyle
*Assistant Examiner* — Berhanu Mitiku (57) ABSTRACT

A technique utilizes a search query having a set of clauses. The technique involves displaying, by a processor, the set of clauses of the search query onto an electronic display. Each clause includes a selection cell describing a selectable operation. The technique further involves receiving, by the processor, a mouse click input from a mouse apparatus. The mouse click input includes coordinates identifying a location that resides within the selection cell of a particular clause. The technique further involves change, by the processor, the selectable operation described by the selection cell of the particular clause between an editing operation and a Boolean operation in response to the mouse click input. Such a technique minimizes user typing and navigation demands, and offers a compact format and considerable power and flexibility when constructing and/or editing a search query.

19 Claims, 10 Drawing Sheets

(56) References Cited

U.S. PATENT DOCUMENTS

2006/0114225 A1* 6/2006 Tsukada .............. G06F 3/03543
                                                    345/157
2006/0277157 A1* 12/2006 Seidl ................. G06F 17/30528
2009/0144307 A1* 6/2009 Bestgen ............ G06F 17/30489
2010/0161646 A1* 6/2010 Ceballos ............. G06F 16/2428
                                                    707/769

* cited by examiner

TECHNIQUES FOR CONSTRUCTING AND EDITING A SEARCH QUERY USING AN OVERLOAD CELL

BACKGROUND

In order to search a database, a user typically constructs a search query and submits the search query to a database engine. In response, the database engine searches the database based on the search query, and returns a listing of entries of the database which satisfy the search query.

Typically, the search query includes a series of search parameters which are combined using search operators (e.g., Boolean functions). Each search parameter typically corresponds to a particular aspect of the data being searched (e.g., a date, a name, a text string, etc.).

One conventional approach to composing a search query, which is referred to as the "simple approach", involves a user manually typing out an entire search query on a keyboard. Another conventional approach to composing a search query, which is referred to as the "graphical-scroll approach", involves a user (using an electronic mouse) scrolling up and down a comprehensive list of selectable search criteria shown on a graphical screen in order to select particular search criteria.

SUMMARY

Unfortunately, there are deficiencies to the above-described conventional approaches to composing a search query. Such deficiencies may lead to inefficiencies and user frustration.

For example, the conventional simple approach does not provide much power or flexibility to the user. Rather, the user is burdened with having to know the correct searching syntax of the particular search query tool operated by the user, and the user must type out the entire search query by hand. Such an approach is difficult, time consuming, and prone to error (e.g., typographical errors).

As another example, the conventional graphical-scroll approach tends to take up too much screen space and forces the user to patiently scroll up and down an excessively long criteria list in order to see all of the available searching criteria. Accordingly, the user is burdened with meticulously navigating a control pointer up and down until the user reaches and selects the appropriate criteria. Such an approach is restrictive and wearing on the user.

In contrast to the above described conventional approaches to composing a search query, improved techniques involve overloading cell functionality in a user interface which is constructed and arranged to enable the user to create and edit search queries. For example, the user can simply click a cell to change the operation of that cell from one that adds a clause to a group of clauses to another which identifies a logical operation (e.g., a Boolean function). Such techniques minimize user typing and pointer navigation demands. Moreover, such techniques offer a compact format and considerable power and flexibility when generating search queries thus enabling the user to construct complex queries in an effective and efficient manner.

One embodiment is directed to a method which involves a search query having a set of clauses. The method includes initially displaying, by a processor, the set of clauses of the search query onto an electronic display. Each clause includes a selection cell describing a selectable operation. The method further includes receiving, by the processor, a mouse click input from a mouse apparatus (e.g., an electronic mouse, a track ball, a touch pad, etc.). The mouse click input includes coordinates identifying a location that resides within the selection cell of a particular clause (e.g., X and Y display coordinates). The method further includes changing, by the processor, the selectable operation described by the selection cell of the particular clause between an editing operation (e.g., adding a clause to a group of clauses) and a Boolean operation (e.g., AND, OR, etc.) in response to the mouse click input.

Other embodiments are directed to a system, a device, and a computer program product which involves use of such a search query. Such embodiments make the task of constructing and editing a search query easy, quick and convenient.

It should be understood that the term overloaded cell refers to a selectable graphical user interface (GUI) cell which is purposefully overloaded in terms of functionality. In some arrangements, clicking on an overloaded cell (i.e., clicking over the selection cell using a mouse apparatus) enables a user to selectively transform a clause from a main-level clause to a lower-level clause of a group, as well as change a Boolean operator of that group. The user is able to choose among these various selections simply by repetitively clicking over the same selection cell location of the GUI.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves overloading cell functionality in a user interface which is constructed and arranged to enable the user to create and edit search queries. For example, the user can simply click a cell to change the operation of that cell from a first operation which adds a clause to a group of clauses and a second operation which identifies a Boolean function. Such a technique minimizes typing and navigation demands on the user. Furthermore, such a technique provides a compact format and considerable power and flexibility when generating search queries thus providing enhanced effectiveness and efficiency to the user.

Figure 1:
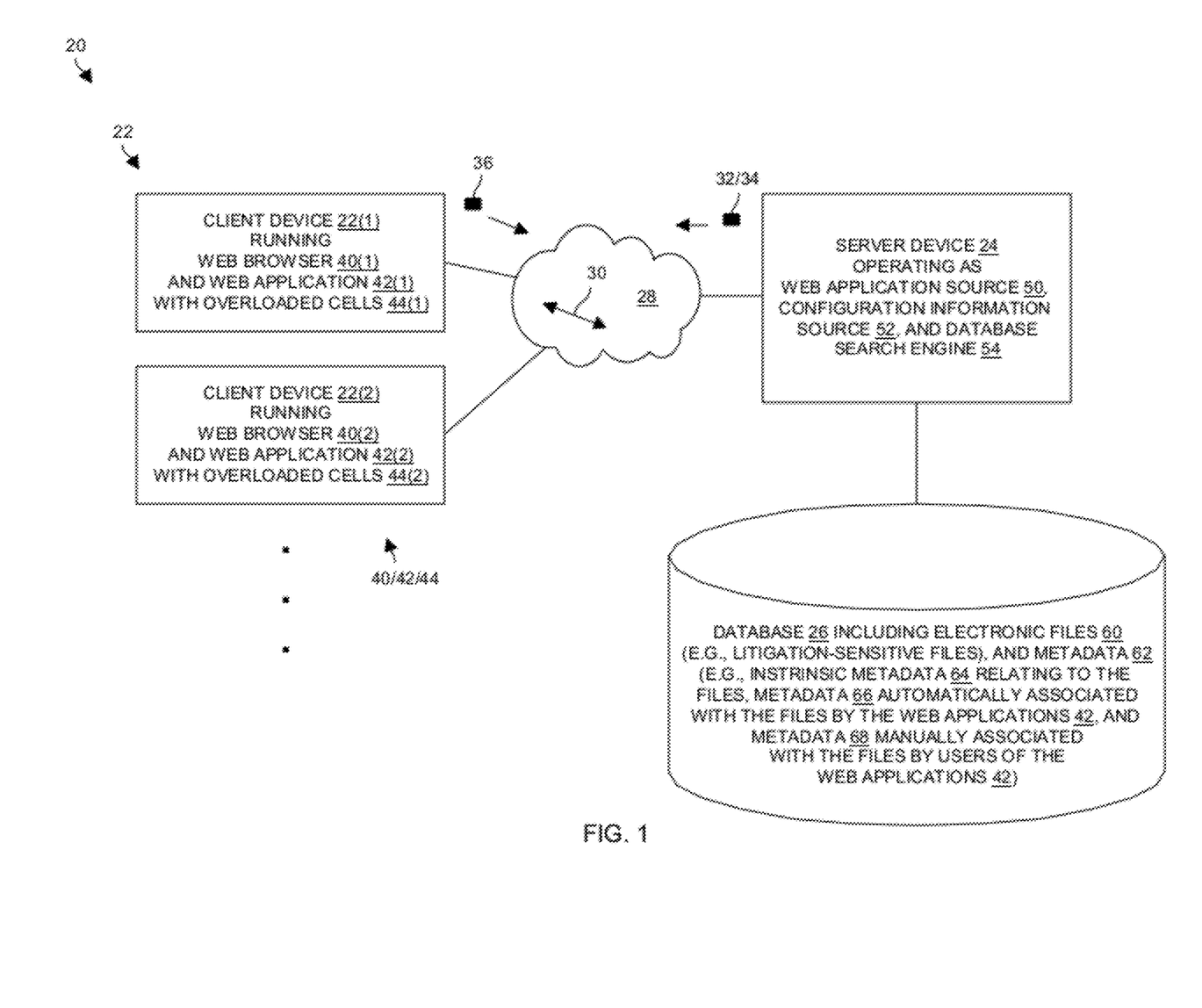
FIG. 1 is a block diagram of an environment for constructing and/or editing search queries using overloaded cells.

FIG. 1 shows an electronic environment 20 which is suitable for building search queries using overloaded cells. The electronic environment 20 includes client devices 22(1), 22(2), . . . (collectively, client devices 22), a server device 24, a database 26, and a communications medium 28.

The communications medium 28 enables various devices of the environment 20 to exchange electronic signals 30. Such communications 30 include deployment of web application code 32 and configuration information 34 from a configuration file, as well as conveyance of search queries 36. The configuration information 34 defines cell selections which are available to the user. Keeping the configuration information 34 separate from the web application code 32 enables new search field types to be added to the web application 42 without modifying the web application code 32.

In some arrangements, one or more portions of the communications medium 28 is formed by a computer network. The communications medium 28 is illustrated as a cloud because it is capable of having a variety of topologies including hub-and-spoke, backbone, loop, irregular, a combination of the Internet and LAN(s), combinations thereof, and so on.

Each client device 22 runs a web browser 40 and a web application 42 within the web browser 40. As will be described in greater detail shortly, the web application 42, which is enabled by the web application code 32 and the configuration information 34 from the configuration file, provides overloaded cells 44 which enable users of the client devices 22 to easily create and edit the search queries 36. Along these lines, each user is able to build complex queries within minimal typing and navigation effort since the users are able to perform a variety of available query editing tasks by simply clicking on the overloaded cells 44. For example, the client device 22(1) runs a web browser 40(1) and a web application 42(1) with overloaded cells 44(1). Similarly, the client device 22(2) runs a web browser 40(2) and a web application 42(2) with overloaded cells 44(2), and so on.

The server device 24 is constructed to operate as a web application source 50, a configuration information source 52, and a database search engine 54. As the web application source 50, the server device 24 sends the web application code 32 to each client device 22 (the presence of multiple client devices 22 enables multiple users to operate within the environment 20 at the same time). As the configuration information source 52, the server device 24 sends the configuration information 34 from a configuration file to each client device 22. As the database search engine 54, the server device 24 receives the search queries 36 from the client devices 22 and searches the database 26 based on the search queries 36. The results of the search operations include listings of database entries (e.g., electronic documents) which fit criteria specified in the search queries 36. In some arrangements, the listings include links to the actual database entries thus enabling the users to click on the links to quickly access the entries directly (e.g., to view content of the documents).

The database 26 includes electronic files (or documents) 60 and metadata 62. The electronic files 60 may include a variety of different types of electronic file constructs (e.g., email files, text files, spreadsheet files, portable document format files, bitmap files, etc.). In some arrangements, the electronic files 60 are stored as an organized collection of documents (e.g., a structured file repository). In other arrangements, the database 26 is simply general storage (e.g., one or more magnetic disks) which is perhaps scattered within different electronic files and folders of a file system.

The metadata 62 is descriptive information regarding the electronic files 60. Such information enables the web application 42 to perform various operations such as individually identifying files, locating files among different locations, categorizing files, and retrieving files, among other things. Along these lines, the metadata 62 includes (i) intrinsic metadata 64 relating to the electronic files 60, (ii) metadata 66 which is automatically associated with the electronic files 60 by the web applications 42, and (iii) metadata 68 which is manually associated with the electronic files 60 by users of the web applications 42.

The intrinsic metadata 64 which relates to the electronic files 60 includes owner information, date stamps, file types, file sizes, etc. Such information may be initially provided when the electronic files 60 are created (e.g., owner information, file types, etc.), modified or updated during routine use of the electronic files 60 (e.g., date stamps, file sizes, etc.), added in standard fashion by a native operating system or application (e.g., version numbers, access privileges, etc.), and so on.

The metadata 66 which is automatically associated with the electronic files 60 by the web applications 42 includes specialized information that is automatically tied to the electronic files 60 by the web applications 42. Such information may be linked to the electronic files 60 when the files are first introduced (i.e., imported) into the electronic environment 20 (e.g., tracking identifiers, time of import into the environment 20, etc.), and/or added during a discovery operation that the web applications 42 perform on the electronic files 60 or an area of storage at a later time. Moreover, such metadata 66 may continue to be added over time (e.g., user identifiers indicating who accessed the electronic files 60 while the electronic files 60 reside in the environment 20, information on whether the electronic files 60 have been exported from the environment 20 and if so where the electronic files 60 have been exported, etc.). Such information enables the web applications 42 to track access and movement of the electronic files 60 as well as impose a level of control/security.

The metadata 68 which is manually associated with the electronic files 60 includes specialized information that is manually added by users of the web applications 42. Such information may include flags/labels to mark/classify certain files 60 as meeting certain criteria (e.g., relevant, hot, etc.), user-added comments, and so on. For example, after some preliminary searching, a user may add notes or highlight certain documents or portions of documents to identify the documents as warranting further review or more substantive study.

In a preferred arrangement, each web browser 40 is provisioned with a Javascript engine. The web application 42 running within that web browser 40 includes Javascript which is retrieved by that web browser 40 (also see reference number 32 in FIG. 1) and run by the Javascript engine (e.g., interpreted, executed, etc.). In particular, the web application 42 provides the user with the ability to construct and edit complex search queries 36 using overloaded cells 44 in a convenient and competent manner. Further details will now be provided with reference to FIG. 2.

Figure 2:
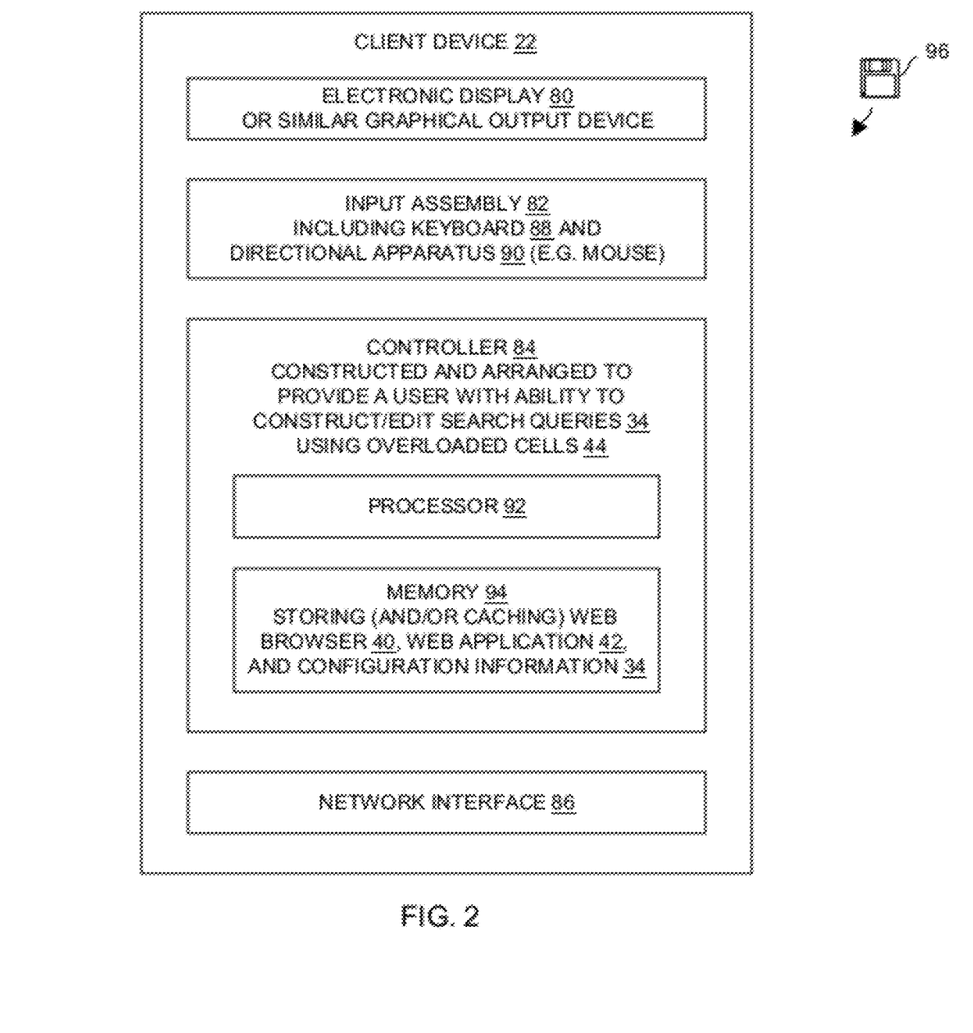
FIG. 2 is a block diagram of an apparatus of the environment of FIG. 1.

FIG. 2 shows particular details of a client device 22 when providing a user with the ability to build a search query 36 using overloaded cells 44. As shown in FIG. 2, the client device 22 includes an electronic display 80, an input assembly 82, a controller 84, and a network interface 86.

The electronic display 80 is constructed and arranged to provide graphical output from the controller 84 to the user. Accordingly, the electronic display 80 may include one or more computer (or television) monitors, or similar style graphical output devices (e.g., projectors, LCD or LED screens, and so on).

The input assembly 82 is constructed and arranged to receive input from the user and convey that user input to the controller 84. Preferably, the input assembly 82 includes a keyboard 88 to receive keystroke user input, and a directional apparatus 90 (e.g., an electronic mouse, touch pad, track ball, etc.) to receive mouse-style user input (e.g., absolute or relative pointer coordinates or similar location information) from the user.

The controller 84 is constructed and arranged to perform operations in response to the user input received through the input assembly 82 and to provide output back to the user through the electronic display 80. The controller 84 includes a processor 92 and memory 94 in order to run an operating system and user level applications. For example, the memory 94 is constructed and arranged to store (or at least cache) code for the web browser 40 and the web application 42 for execution by the processor 92.

The network interface 86 is constructed and arranged to electronically connect to the communications medium 28 (also see FIG. 1). With such a connection, the client device 22 is able to electronically communicate with other electronic devices such as the server device 24.

During operation, the controller 84 responds to commands entered by the user through the input assembly 82. In particular, in response to a launch command from the user to launch the web browser 40, the controller 84 runs the web browser 40 resulting in display of a web browser window on the electronic display 80. Additionally, in response to a web browsing command from the user to run the web application 42 within the web browser 40, the controller 84 runs the web application 42 which renders a web page with specialized behavior within the web browser 40.

In some arrangements, the controller 84 communicates with the server device 24 to load the web application 42. To this end, recall that the server device 24 is constructed and arranged to operate as a web application source 50 and a configuration information source 52. In particular, when the web browser 40 receives a web page in response to the web browsing command from the user, the web browser 40 is directed by information in a web page to retrieve the web application code 32 (e.g., Javascript) and the configuration information 34 from the web application source 50.

In other arrangements, a computer program product 96 delivers the web application code 32 and the configuration information 34 to the controller 84 (also see FIG. 2). The memory 94 stores the web application code 32 and the configuration information 34 locally in a non-volatile manner. The computer program product 96 has a non-transitory (or non-volatile) computer readable storage medium which stores the web application 42 as instructions which can be carried out by the processor 92. Examples of suitable computer readable storage media include tangible articles of manufacture and apparatus which store instructions in a non-volatile manner such as CD-ROM, flash memory, disk memory, tape memory, and the like.

Further details of the web application 42 will now be provided with reference to FIGS. 3-9. It should be understood that the web application 42 will be further described in the context of an "eDiscovery" or litigation support application, i.e., a specialized platform or program which searches electronic files for legal purposes. For example, a user may be faced with a task of minimizing the amount of data to be sent to outside counsel for review. Such data may be part of an early case assessment or a potential litigation. Along these lines, the user may wish to cull documents which are not relevant but may contain potentially sensitive information. To this end, the user is able to construct and edit database queries in a convenient and competent manner using the overload cells 44 of the web application 42. For example, the user simply clicks on the overloaded cells 44 to perform different types operations such as adding a clause to a group of clauses (i.e., moving a current clause into the group and adding a new clause to that group), selecting a Boolean function, etc.

Figure 3:
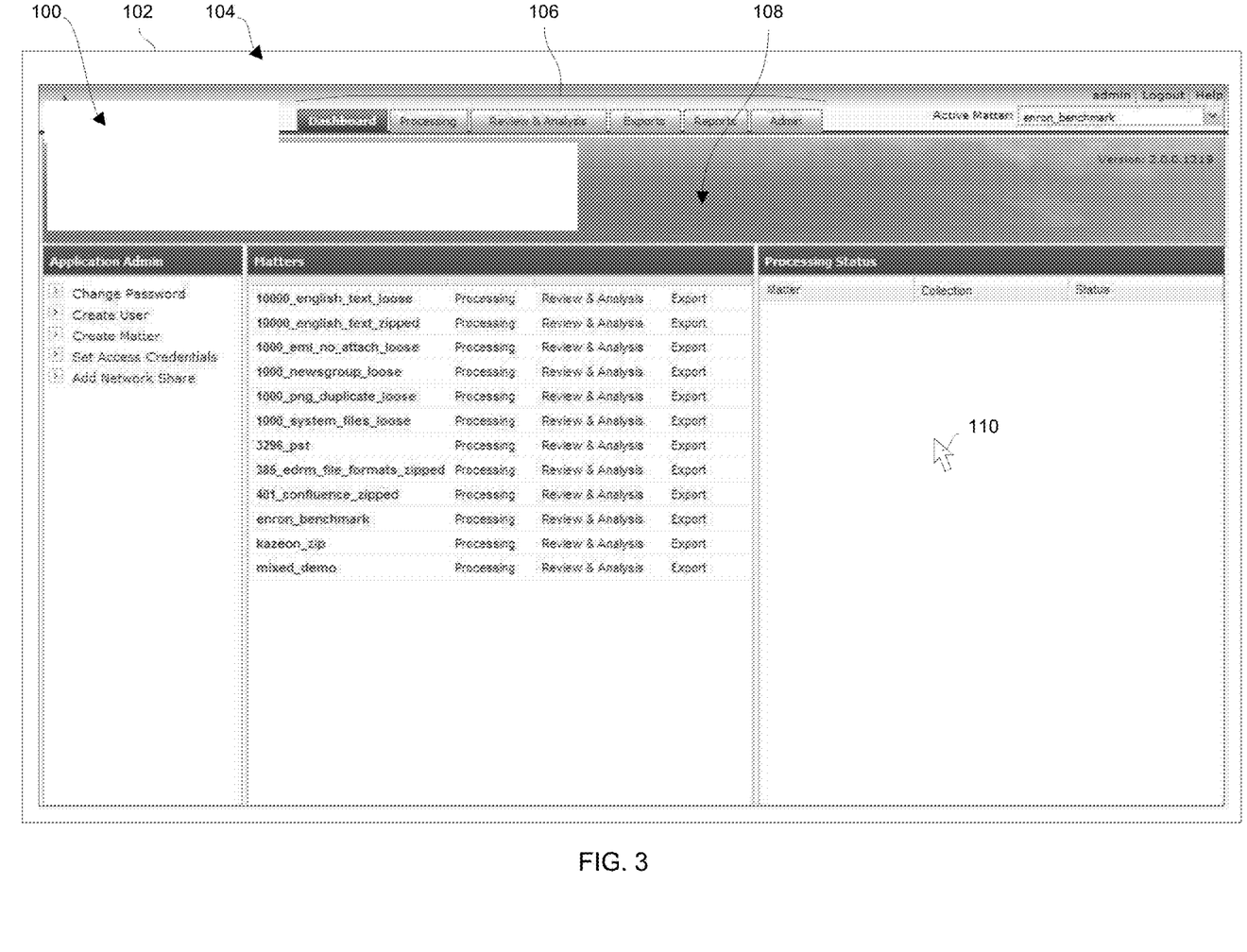
FIG. 3 is an example diagram of a main graphical user interface (GUI) screen displayed on an electronic display of the apparatus of FIG. 2.

FIG. 3 shows an example graphical user interface (GUI) 100 which is displayed on the electronic display 80 of a particular client device 22 (FIGS. 1 and 2). To reach this point, a user inputs a launch command to the input assembly 82 of the client device 22 to launch the web browser 40. In response to the launch command, the web browser 40 displays a web browser window 102 having a viewable area 104 on the electronic display 80. Preferably, the web browser window 102 includes a variety of standard features including a menu bar, a command bar, a status bar, and so on. Accordingly, the web browser window 102 is illustrated in FIG. 3 as a box for simplicity.

Next, the user inputs a web browsing command to the web browser 40. The web browsing command specifies a particular web page to load. The web browser 40 responds to the web browsing command by loading that web page which includes retrieving the web application code 32 and the configuration information 34 from the server device 26 (FIG. 1). The web browser 40 then runs the web application 42 based on the web application code 32 and the configuration information 34 thus rendering the GUI 100 within the web browser window 102. In some arrangements, the web application 42 initially prompts the user for security information (e.g., a login name and password).

As shown in FIG. 3, the GUI 100 offers a variety of selectable tabs 106. The web application 42 may change one or more panes 108 and the information within the panes 108 based on the currently selected tab 106. By way of example, the GUI 100 initially includes a main screen 108 (i.e., a dashboard view) which is rendered within the web browser window 102 immediately after the user logs on. In addition to offering enhanced query building capabilities, it should be understood that the web application 42 may offer a variety of standard features as well. The Stratify Legal Discovery™ product (SLDS), which is provided by Iron Mountain Incorporated of Boston Mass., offers a variety of functions which are suitable for use by the web application 42 particularly in the context of a litigation support application.

To construct a search query 36, the user selects the "Review & Analysis" tab 106 by moving a mouse cursor or similar pointer 110 over the "Review & Analysis" tab 106 and clicking a selection button (e.g., a left mouse button) of the directional apparatus 90 (hereinafter simply referred to as "clicking the mouse"). It should be understood that the web application 42 (e.g., Javascript running on a Javascript engine of the web browser 40) is constructed and arranged to receive user input in this manner. In response, the web application 42 identifies the particular cell that was selected from the mouse coordinates and renders a query editing screen in place of the main screen 108.

Figure 4:
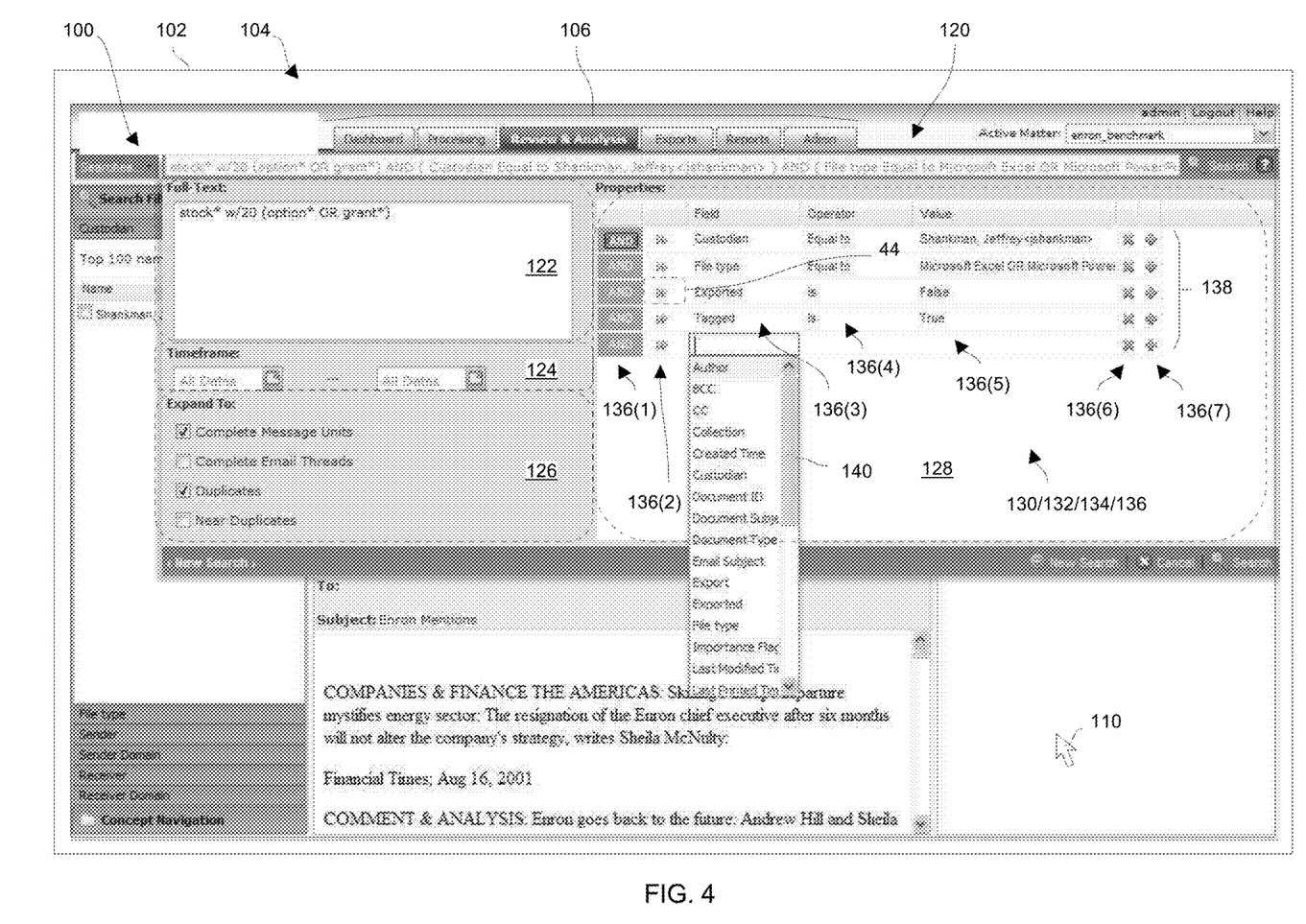
FIG. 4 is an example diagram of a search screen displayed on the electronic display of the apparatus of FIG. 2 when a user chooses a field selection of a clause.

FIG. 4 shows an example query editing screen 120 of the GUI 100. As shown, the query editing screen 120 includes a full-text region (or pane) 122, a timeframe region 124, an expand-to region 126 and a properties region 128. Using the query editing screen 120, the user is able to construct or modify a search query 36 for searching the database 26 (FIG. 1) which includes criteria from these regions individually or in combination with each other.

The full-text region 122 is configured to receive full-text type searching criteria. An example of such criteria are words which must be found within a particular word distance in the same document (e.g., within 20 words).

The timeframe region 124 is configured to receive timeframe input from the user. An example of timeframe input is a start date and an end date to indicate the bounds of a time period. It should be understood that the web application 42 searches the database 26 for files based on the time period in different ways depending on the type of files under consideration. For example, in the context of email messages, the web application 42 can search for email messages that have date stamps which fall within the time period. As another example, in the context of word processing documents, the web application 42 can search for documents that have access or saved dates which fall within the time period, and so on.

The expand-to region 126 is configured to receive search expansion criteria from the user thus providing the user with the ability to retrieve additional electronic files 60. For example, if the web application 42 finds that a particular email message satisfies the criteria of a particular search, the web application 42 can report all emails (e.g., earlier and later) that reside in the database 26 that belong to the same email thread. As another example, if a particular electronic file 60 satisfies the criteria of a particular search, the web application 42 can report other electronic files 60 which are duplicates or perhaps near duplicates of that file 60.

The properties region 128 is configured to facilitate creation and editing of complex search queries while placing minimal navigation demands on the user. As shown in FIG. 4, the properties region 128 is structured as a two-dimensional array 130 of cells 132. The cells 132 are organized into rows 134 and columns 136. The rows 134 of cells 132 define search clauses 138 which form criteria for a search query 36. In particular, each row 134 defines a particular clause 138.

For enhanced query building, the user input from the properties region 128 can be combined with user input from the other regions 122, 124 and 126. As a result, the search query 36 can include selections from the properties region 128 in combination with full-text query input, Boolean flags, other values, and so on. Such operation is particularly useful in an application which searches documents which are under potential litigation scrutiny.

With further reference to the properties region 128, the columns 136 of cells 132 of the two-dimensional array 130 display different attributes of the rows/clauses 134/138 (hereafter simply clauses 138). In particular, a first column 136(1) displays, as its cells 132, Boolean operations which are executed between the clauses 138. A second column 136(2) displays, as its cells 132, specialized cells 44 which are overloaded in terms of functionality (also see the overloaded cells 44 in FIG. 1). A third column 136(3) displays, as its cells 132, field information for the clauses 138. A fourth column 136(4) displays, as its cells 132, operator information for the clauses 138. A fifth column 136(5) displays, as its cells 132, value information for the clauses 138. A sixth column 136(6) displays, as its cells 132, DELETE buttons to delete clauses 138 from the search query 36. A seventh column 136(7) displays, as its cells 132, ADD buttons to add clauses 138 to the search query 36.

With respect to the first column 136(1) of cells 132, the cells 132 display the Boolean operation that is to be executed for all clauses 138: AND or OR. By way of example only, the clauses 138 of the search query 36 in FIG. 4 are Boolean ANDed together.

With respect to the second column 136(2) of cells 132, the cells 132 display any one of the following:
a symbol (e.g., double right arrows) that allows the creation of a group of clauses 138;
a symbol (e.g., double left arrows) that allows the destruction of a group of clauses 138 (and perhaps promotion of the clauses in the group to a main-level); and
a Boolean operator (e.g., AND, OR) which is executed between clauses 138 of a group of clauses (i.e., lower-level clauses).

With respect to the third column 136(3) of cells 132, the cells 132 display selectable field choices: file type, last modified time, tags, whether the files 60 have already been exported, author, custodian, and so on. Left clicking the pointer 110 over a cell 132 of the third column 136(4) results in displaying a list of different field information selections. By way of example, FIG. 4 shows a portion of a suitable list of field information selections 140 which are displayed to the user when the user left clicks on a cell 132 of the third column 136(3). In terms of upgradability, additional search aspects for the field information can be added by enhancing the configuration information 34 from the configuration information source 52 (FIG. 1) without any code modifications to the web application 42.

Figure 5:
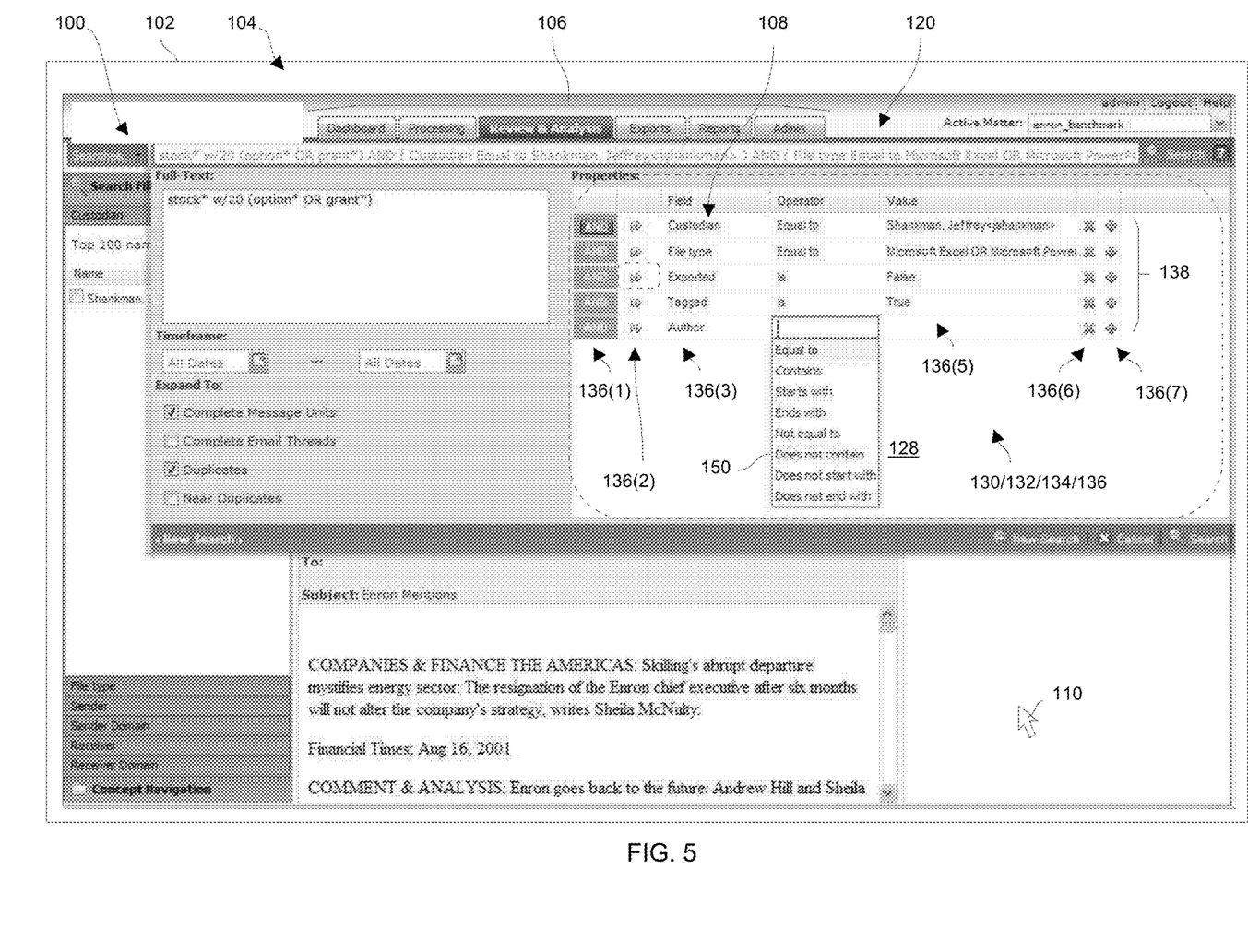
FIG. 5 is an example diagram of the search screen of FIG. 4 when the user chooses an operation selection of the clause.

With respect to the fourth column 136(4) of cells 132, the cells 132 display different types of operator choices for the clauses 138 depending on the selected field information. The list of selectable operator choices in a particular clause 138 is dependent on the current field setting of that clause 138, i.e., the choice in column 136(3) for that clause 138. By way of example, FIG. 5 shows a portion of a suitable list of operator selections 150 which are displayed to the user when the user left clicks on a cell 132 of the fourth column 136(4).

It should be understood that, in contrast to a conventional graphical-scroll approach which takes up significant screen space and forces the user to scroll up and down to see all criteria, the operation of the GUI 100 which limits the list of selectable operator choices based on the earlier-selected field choice effectively reduces the amount of choices that would otherwise be listed. For example, when "file type" field information is selected, left clicking the pointer 110 over a cell 132 of the fourth column 136(4) results in displaying a list of appropriate operators for selection of file type field information such as "equal to" or "not equal to". As another example, when "last modified" field information is selected, left clicking the pointer 110 over a cell 132 of the fourth column 136(4) results in displaying operators for selection of "last modified" field information such as "between", "before", "after", and so on.

Figure 6:
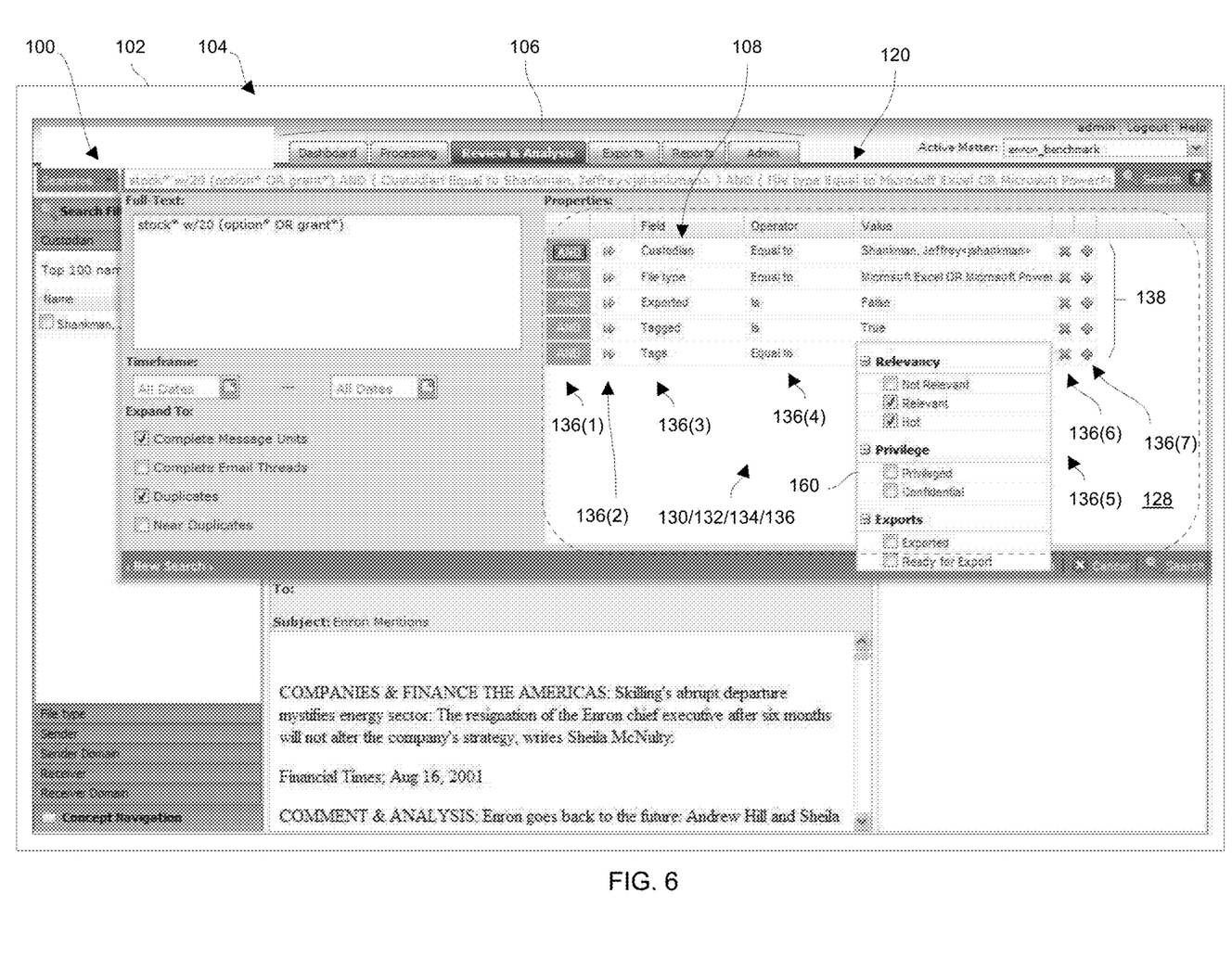
FIG. 6 is an example diagram of the search screen of FIG. 4 when the user chooses a value selection of the clause.

With respect to the fifth column 136(5) of cells 132, the cells 132 display value choices for the clauses 138. The enhanced operation of the GUI 100 limits the list of selectable value choices based on the earlier-selected operator choice. For example, when "file type" field information and the "equal to" operator are selected, left clicking the pointer 110 over a cell 132 of the fourth column 136(4) results in displaying a list of different file types (e.g., .doc, .pdf, .txt, etc.). As another example, when "exported" field information and the "equal to" operator are selected, left clicking the pointer 110 over a cell 132 of the fourth column 136(4) results in displaying a list of appropriate values (e.g., "True" or "False"). By way of example, FIG. 6 shows a portion of a suitable list of value selections 160 which are displayed to the user when the user left clicks on a cell 132 of the fifth column 136(5) such as different predefined attachable tags.

With respect to the sixth column 136(6) (FIGS. 4-6), a DELETE button (e.g., an "X") is displayed in each clause 138. In some arrangements, if the user clicks on the DELETE button of a particular clause 138, the web application 42 immediately deletes the particular clause 138 from the search query 36. In other arrangements, the web application 42 prompts the user to confirm that the particular clause 138 should be deleted and then deletes that clause 138 from the search query 36 if the user provides confirmation.

With respect to the seventh column 136(7) (FIGS. 4-6), an ADD button (e.g., the "+" symbol) is displayed in each clause 138. If the user clicks on the ADD button of a particular clause 138, the web application 42 adds another clause 138 (i.e., a new clause 138 to be filled out by the user) immediately underneath the particular clause 138.

Figure 7:
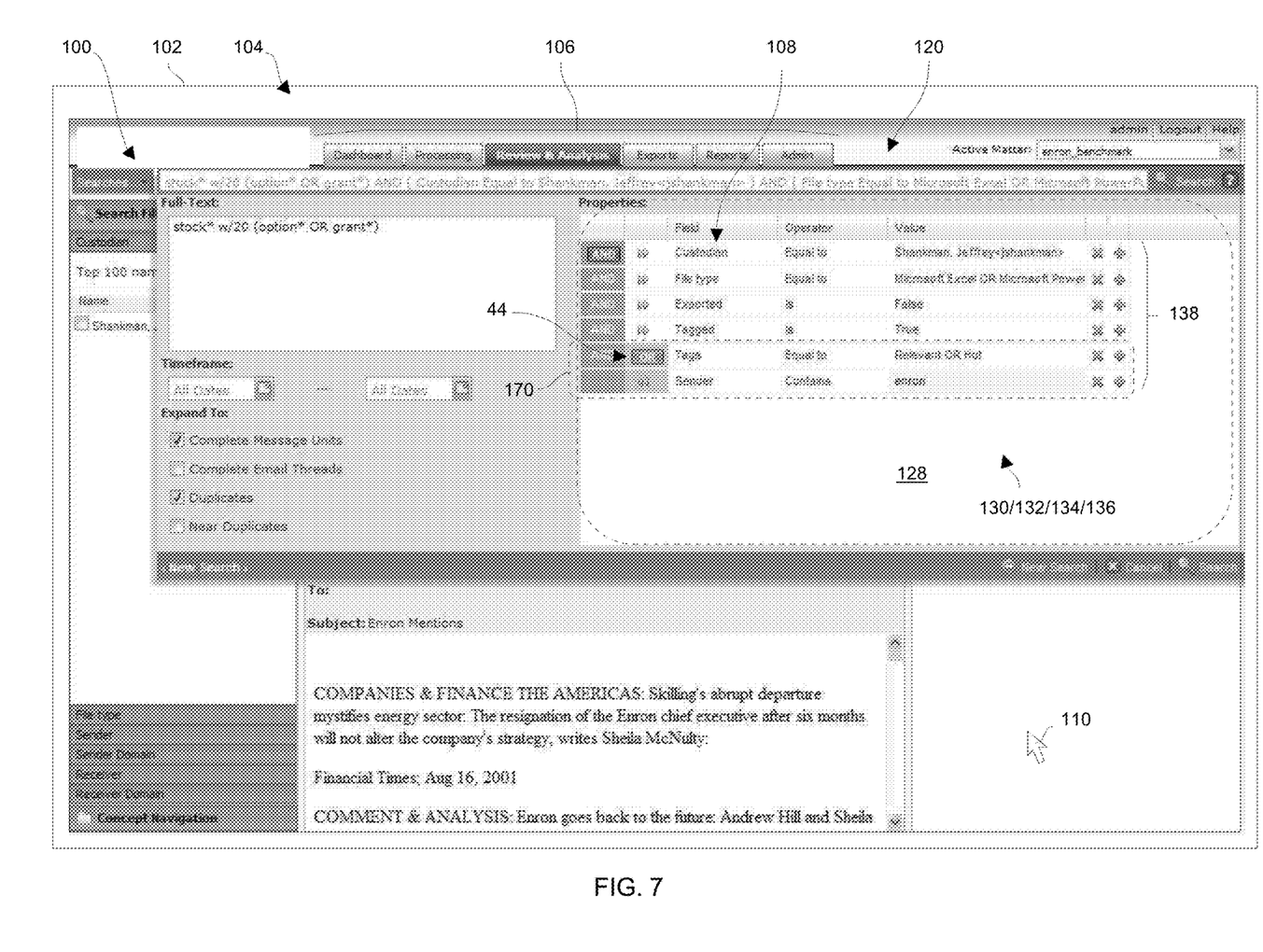
FIG. 7 is an example diagram of the search screen of FIG. 4 showing a group of clauses which uses a Boolean OR operator.
Figure 8:
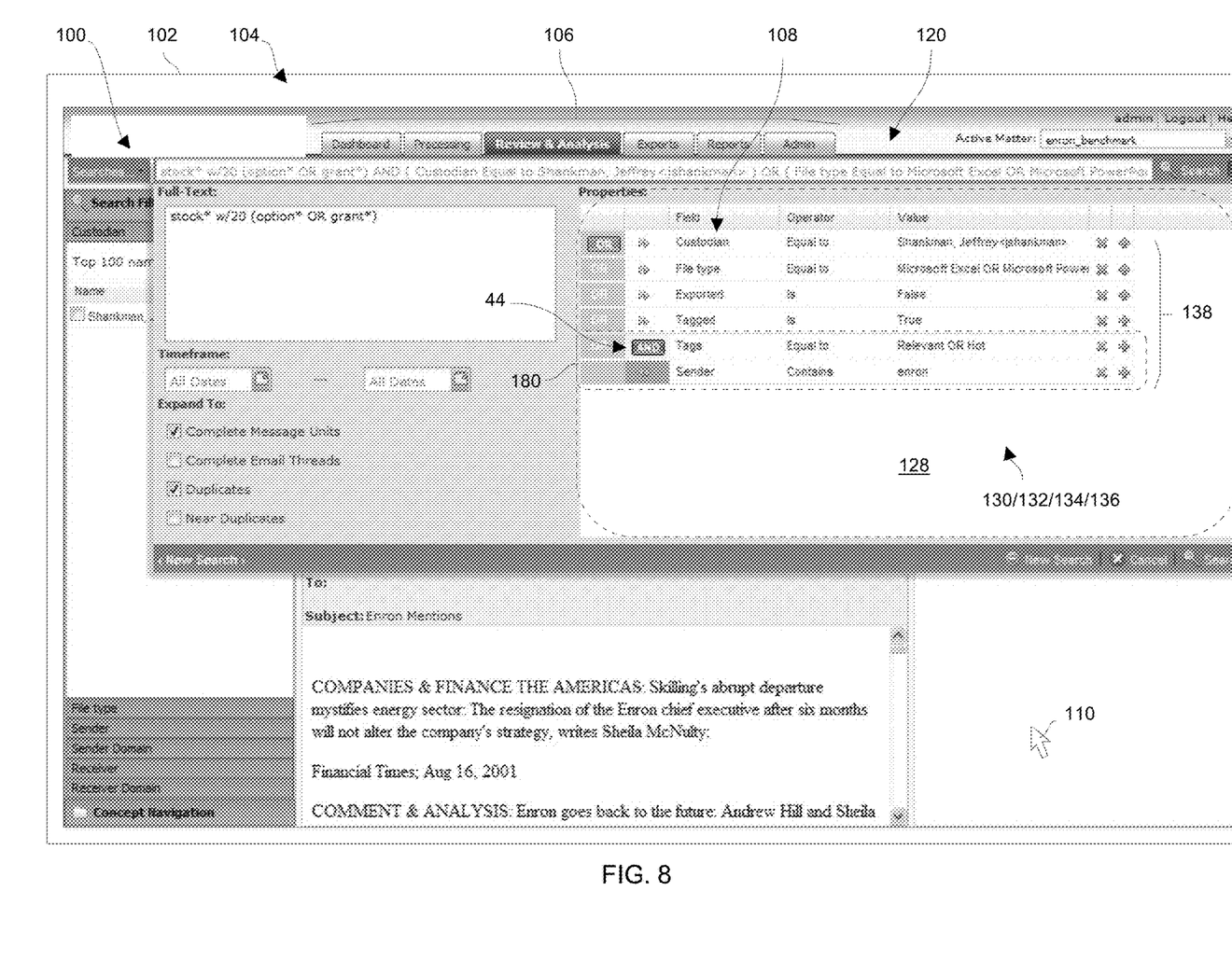
FIG. 8 is an example diagram of the search screen of FIG. 4 showing a group of clauses which uses a Boolean AND operator.

FIGS. 7 and 8 illustrate some of the overloaded cell operation of the GUI 100. Recall that the term overloaded cell refers to a selectable GUI cell which is purposefully overloaded in terms of functionality. In particular, clicking on an overloaded cell 44 in column 136(2) of FIGS. 4-6 enables the user to select functions of different types. Such choices include transforming a clause into a group of lower-level clauses, and selecting a Boolean operation for that group (e.g., switching between AND and OR operators).

By way of example, FIGS. 7 and 8 show groups 170, 180 of clauses 138 which can belong to the search query 36. Each group 170, 180 acts as a single main-level clause 138 of the search query 36. However, each group 170, 180 actually includes multiple lower-level clauses 138 (or subclauses) and a Boolean operation. FIG. 7 includes a subgroup 170 having lower-level clauses 138 (e.g., "Tags" and "Sender" clauses 138) which are Boolean OR'd together as illustrated by the overloaded cell 44 containing the OR operator. FIG. 8 includes a group 180 having lower-level clauses 138 (e.g., "Tags" and "Sender" clauses 138) which are Boolean AND'd together as illustrated by the overloaded cell 44 containing the AND operator.

When a user left clicks on the overloaded cell 44 of a main level clause 138 while the overloaded cell 44 shows a double right arrow graphic, the user is directing the overloaded cell 44 to transform the main level clause 138 into a group of lower-level clauses 138. In response, the web application 42 transforms the main level clause 138 into a first lower-level clause 138 of the group and adds a new lower-level clause 138 to the group immediately below the first lower-level clause 138. By way of example, the initial Boolean operation for the group of lower-level clauses 138 is "AND", as shown in FIG. 8.

Once the web application 42 has created the group of lower-level clauses 138 and the overloaded cell 44 displays a Boolean operator, the user is able to change the Boolean operation by further left clicking on the overloaded cell 44. For example, when the overloaded cell 44 displays "AND" (FIG. 8), the user can easily change the Boolean operator of the group 180 to "OR" (FIG. 7) by left clicking on the overloaded cell 44. Similarly, when the overloaded cell 44 displays "OR" (FIG. 7), the user can easily change the Boolean operator of the group 170 to "AND" (FIG. 8) by left clicking on the overloaded cell 44. Accordingly, the user is able to perform a variety of different types of tasks by simply clicking over the same overloaded cell 44.

As shown in FIGS. 7 and 8, the overloaded cell 44 of the bottom lower-level clause 138 of each group 170, 180 displays a double left arrow graphic. The user is able to destroy a group 170, 180 of lower-level clauses 138 by clicking on the double left arrow graphic of that overloaded cell 44. In particular, when the user left clicks on the double left arrow graphic of the bottom lower-level clauses 138 in groups 170, 180, the web application 42 deletes the groups 170, 180 and promotes the existing lower-level clauses 138 to main-level clauses 138.

In some arrangements, all of the lower-level clauses 138 immediately become main-level clauses 138 in response to left clicking over the double left arrow in the group 170, 180. In other arrangements, the web application 42 prompts the user to confirm that the group 170, 180 should be deleted and only deletes the group 170, 180 if the user provides confirmation. By way of example, the initial Boolean operation for the promoted main-level clauses 138 is "AND".

It should be understood that such overloading of the cell functionality provides the user with the ability to perform complex tasks without signification navigation or typing. Rather, the user is able to carry out relatively comprehensive query building activities (e.g., adding a group 170, 180 of lower-level clauses 138, changing the Boolean operation of the group 170, 180 of lower-level clauses 138, etc.).

Figure 9:
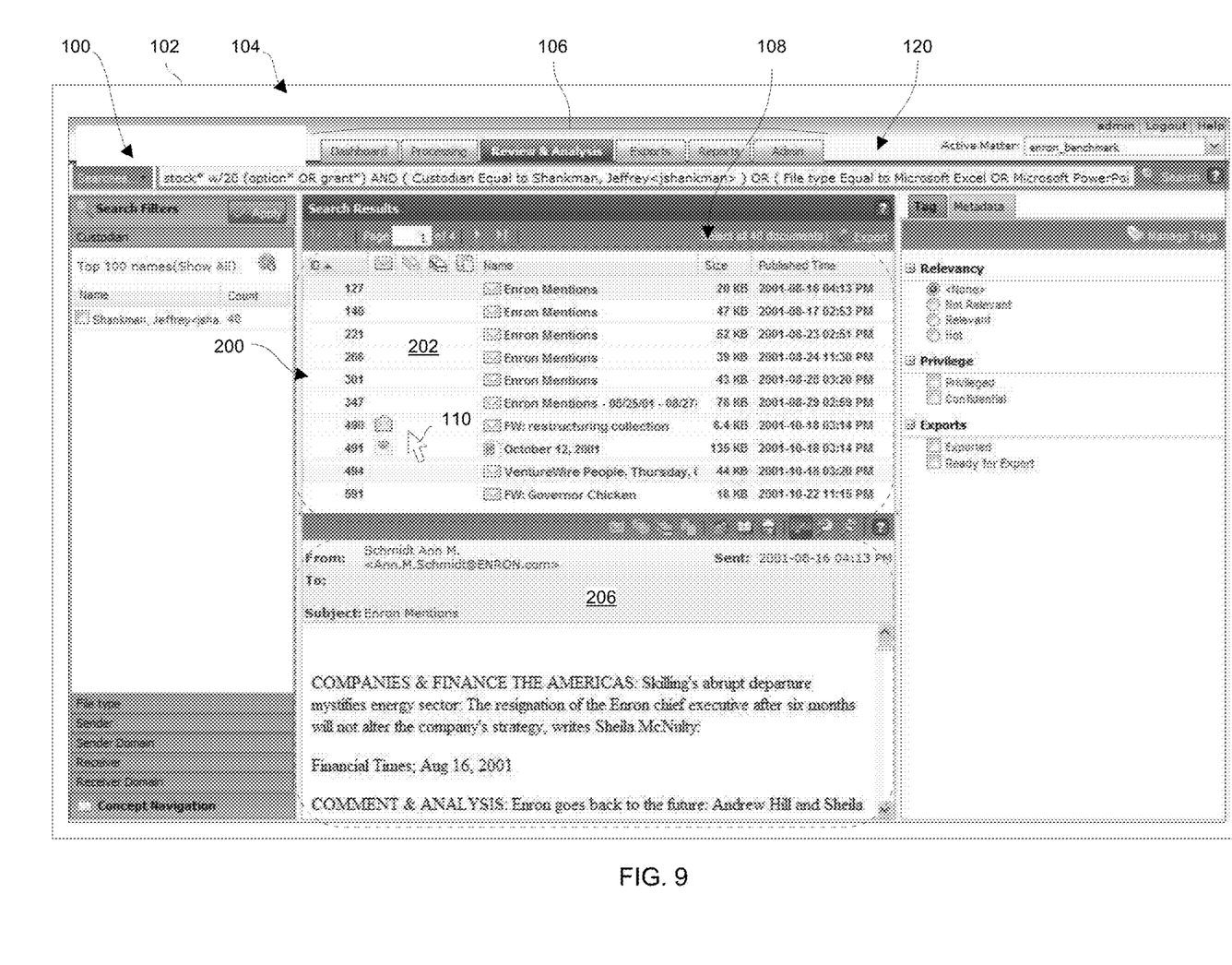
FIG. 9 is an example diagram showing a set of search results which are provided in response to a search query created by the user.

FIG. 9 shows search results 200 from the search query 36, i.e., a list of electronic files 60 which satisfy the search criteria. In particular, once the user is finished constructing or editing a search query 36, the user provides a search command to the GUI 100. The controller 84 responds by submitting the search query 36 to the search engine 54 through the communications medium 28 (also see FIG. 1).

Upon receipt of the search query 36, the search engine 54 searches the database 26 based on the search query 36. In particular, the search engine 54 examines the electronic files 60 as well as all of the metadata 62 associated with the files 60 to find files 60 matching the criteria set forth in the search query 36.

Next, the search engine 54 returns the search results 200 through the communications medium 28, and the GUI 100 renders the results 200 in a region 202. In some arrangements, the GUI 200 enables the user to inspect the contents of each result 200 in an inspection area 206 of the GUI 100 by clicking the mouse pointer 110 over that result 200. Such operation is essentially a command from the user to retrieve the specific contents of a particular electronic file 60 from the database 26 to the client device 22 and to render the contents within the inspection area 206 for closer user examination.

At this point, the user may choose to export a copy of one or more of the identified electronic files 60 of the search results 200. Alternatively, the user may simply tag or add comments to the electronic files 60. During this activity, the web application 42 adds metadata 68 to electronic files 60 to enhance further handling of the electronic files 60.

Figure 10:
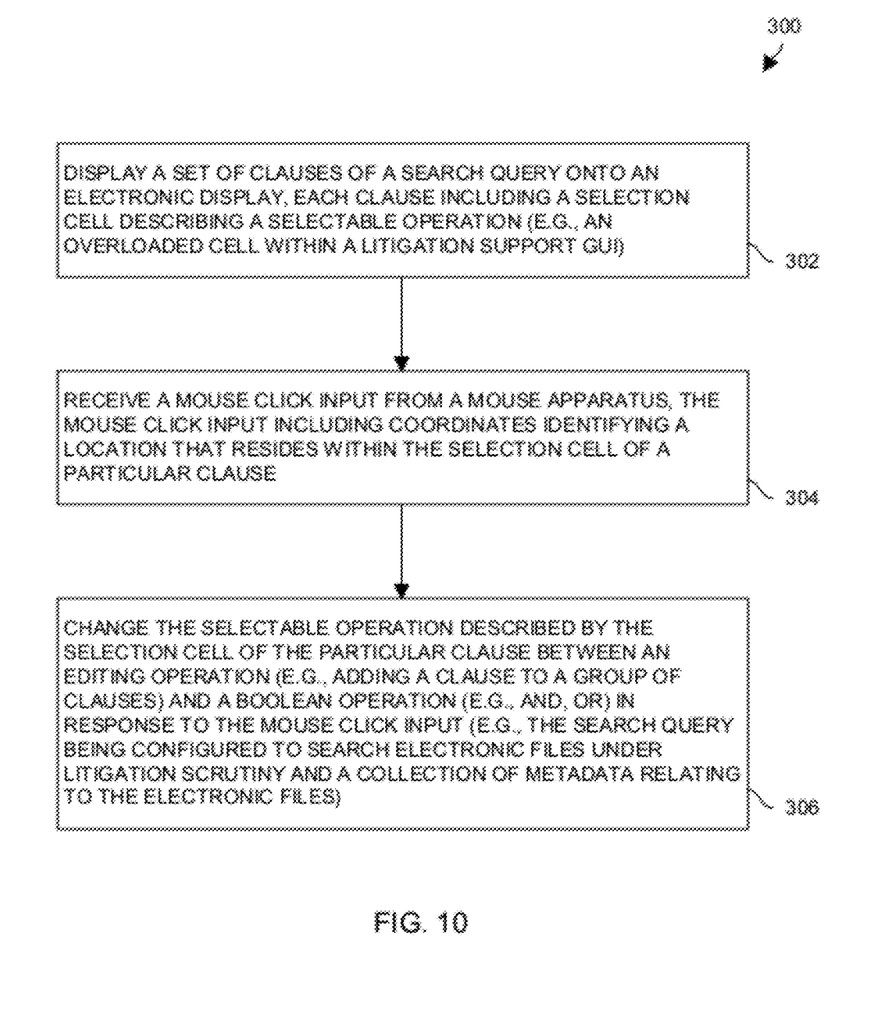
FIG. 10 is a flowchart of a procedure which is performed by the apparatus of FIG. 2 when building a search query using an overloaded cell.

FIG. 10 is a flowchart of a procedure 300 which is performed by the controller 84 of a client device 22 enabling a user to utilize the overloaded cell feature of the GUI 100. In step 302, the controller 84 displays a set of clauses 138 of a search query 36 onto the electronic display 80 of the client device 22 (see FIG. 2). Each clause 138 includes an overloaded cell 44 describing a selectable operation (see FIG. 4).

In step 304, the controller 84 receives a mouse click input from the directional apparatus 90 of the input apparatus 80, The mouse click input including coordinates identifying a location that resides within the overloaded cell 44 of a particular clause 138 (e.g., see FIG. 4).

In step 306, the controller 84 changing the selectable operation described by the overloaded cell 44 of the particular clause 138 between an editing operation and a Boolean operation in response to the mouse click input. As a result, the GUI 100 identifies the new operation that the user has selected. Such operation enables the user to effectively and efficiently create or modify the search query 36 without substantial navigation effort. Once the user has finished editing the search query 36, the user enters a search command into the GUI 100 and the GUI 100 coordinates completion of the search query 36 with the search engine 54 on the server device 24.

In connection with groups 170, 180 of clauses 138, if the user clicks on an overloaded cell 44 displaying a double right arrow graphic, the controller 84 responds by creating a group 170, 180 of lower-level clauses 138. If the user clicks on an overloaded cell 44 displaying a double left arrow graphic, the controller 84 responds by deleting the group 170, 180 of lower-level clauses 138 and promoting the existing lower-level clauses 138 to a higher level.

In connection with logical operations, if the user clicks on an overloaded cell 44 displaying "AND", the controller 84 responds by switching the Boolean operation from AND to OR. Similarly, if the user clicks on an overloaded cell 44 displaying "OR", the controller 84 responds by switching the Boolean operation from OR to AND.

It should be generally understood that the cells 132 of the GUI 100 enable the web application 42 to provide information back to the user in a compact format. In particular, rather than provide the user with an excessively long list of selections as in a conventional graphical-scroll approach, the listed selections change depending on what is selected in the particular cells 132.

It should be further understood that the overloaded cells 44 minimize the typing demands on the user. That is, the user is able to select certain criteria or operations from a short list. Along these lines, there is no need for the user to hold down a pointer for long periods while a list scrolls by. Rather, the selections are much shorter since the selections depend on what is in the other cells 138.

Moreover, the GUI 100 can be enhanced via augmentation of the configuration information 34 from the configuration information source 52. Accordingly, there is no need to modify the web application code 32.

As described above, an improved technique involves overloading cell functionality in a GUI 100 which is constructed and arranged to enable the user to create and edit search queries 36. For example, the user can click an overloaded cell 44 to change the operation of that cell 44 from an editing operation (e.g., adding a group of lower-level search query clauses) to a logical operation (e.g., a Boolean function). Such a technique minimizes user typing and pointer navigation demands. Moreover, such a technique offers a compact format and considerable power and flexibility when generating search queries 36 thus enabling the user to construct complex queries in an effective and efficient manner.

While various embodiments of the invention have been particularly shown and described, it will be understood by those skilled in the art that various changes in form and details may be made therein without departing from the spirit and scope of the invention as defined by the appended claims.

For example, the database 26 was shown in FIG. 1 as being connected directly to the server device 24. However, in other arrangements, the database 26 connects to the communications medium 28 thus enabling the server device 24 to reach the database 26 through the communications medium 28, e.g., over a computer network.

Additionally, it should be understood that, in some arrangements, one or more of the components of the environment 20 are co-located. For example, in some arrangements, the components of a client device 22 and the server device 24 reside in a single computer system. As another example, in some arrangements, the components the server device 24 and the database 26 reside in a single computer system. In yet other arrangements, the components of a client device 22, the server device 24 and the database 26 reside in a single computer system.

Furthermore, it should be understood that the server device 24 was described above as being constructed to operate as a web application source 40, and a database search engine 42. In some arrangements, these two operations are distributed across separate devices.

Additionally, it should be understood that the GUI 100 was described above as being implemented as a web application 42 which runs on a web browser 40 by way of example. In some arrangements, the GUI 100 is implemented as executable code which installs and runs locally on a computerized device.

Furthermore, it should be understood that the application 42 was described above as being appropriate for litigation support by way of example. The query building features of the application 42 are well-suited for other types of searching as well such as general database searching, and custom or specialized searching of particular types of files 60. Such modifications and enhancements are intended to belong to various embodiments of the invention.

What is claimed is:

1. A method which involves a search query having a set of clauses, the method comprising:

displaying, by a processor, the set of clauses of the search query onto an electronic display, each clause including a field cell, an operator cell, and a selection cell, wherein the selection cell is an overloaded cell that allows selection of multiple functions;

receiving, by the processor, a first mouse click input from a mouse apparatus in the selection cell of a particular clause;

in response to receiving the first mouse click input in the selection cell, generating a grouping of lower-level clauses for the search query;

receiving, by the processor, a second mouse click input in the selection cell of the particular clause, wherein each of the first and second mouse click inputs is a single mouse click input including coordinates identifying any location that resides within the selection cell of the particular clause, and wherein the second mouse click input is subsequent to the first mouse click input; and in response to receiving the second mouse click input in the selection cell, generating a Boolean operation between the lower-level clauses in the grouping of lower-level clauses.

2. A method as in claim 1 wherein the processor runs a litigation support application which renders a litigation support graphical user interface (GUI) window on the electronic display, the litigation support GUI window including the set of clauses of the search query; and wherein the method further comprises:

after generating the Boolean operation between the lower-level clauses, (i) receiving a search command from a user of the litigation support application and (ii) performing a search operation based on the search query having the set of clauses in response to the search command.

3. A method as in claim 2 wherein performing the search operation includes: searching a collection of metadata which includes (i) intrinsic metadata relating to a set of litigation-sensitive electronic files, (ii) metadata automatically associated with the set of litigation-sensitive electronic files by the litigation support application, and (iii) metadata manually associated with the set of litigation-sensitive electronic files by the user of the litigation support application.

4. A method as in claim 1, wherein generating the grouping of lower-level clauses comprises:
transforming the particular clause into a first lower-level clause of the grouping of lower-level clauses, and
adding a second lower-level clause to the grouping of lower-level clauses.

5. A method as in claim 1, further comprising:
deleting, by the processor, the grouping of lower-level clauses in response to further mouse click input which selects a selection cell of one lower-level clause of the grouping of lower-level clauses.

6. A method as in claim 1, wherein the Boolean operation comprises one selected from a Boolean AND operation or a Boolean OR operation.

7. A method as in claim 6,
wherein the Boolean AND operation is to impose, on the search query, compliance of the particular clause concurrently with an other lower-level clause of the group of lower-level clauses; and
wherein the Boolean OR operation is to impose, on the search query, compliance of the particular clause, the other lower-level clause, or both the particular clause and the other lower-level clause.

8. A method as in claim 3, further comprising:
presenting, by the processor, a set of search results in the litigation support GUI window in response to searching the collection of metadata, the set of search results identifying particular electronic files of the set of litigation-sensitive electronic files which satisfy the set of clauses of the search query.

9. A method as in claim 8, wherein the set of litigation-sensitive electronic files resides on a server device;
wherein a client device includes the processor, the electronic display and the mouse apparatus; and
wherein the method further comprises:
after presenting the set of search results in the litigation support GUI window rendered on the electronic display, (i) receiving a retrieve command from the user of the litigation support application, the retrieve command identifying a particular electronic file identified by the set of search results and (ii) retrieving content of the particular electronic file from the set of litigation-sensitive electronic files residing on the server device and displaying the content of the particular electronic file in the litigation support GUI window in response to the retrieve command.

10. An electronic device, comprising:
an electronic display;
a mouse apparatus; and
a controller coupled to the electronic display and the mouse apparatus, wherein the controller is to:
display a plurality of clauses of a search query onto the electronic display, each clause including a field cell, an operator cell, and a selection cell, wherein the selection cell is an overloaded cell that allows selection of multiple functions;
receive a first mouse click input, from the mouse apparatus, in any location within the selection cell of a particular clause;
in response to receipt of the first mouse click input in the selection cell of the particular clause, generate a grouping of lower-level clauses for the search query;
receive a second mouse click input, from the mouse apparatus, in the selection cell of the particular clause, wherein the second mouse click input is subsequent to the first mouse click input, and wherein each of the first and second mouse click inputs is a single mouse click input in the selection cell of the particular clause; and
in response to receipt of the second mouse click input in the selection cell of the particular clause, generate a Boolean operation between the lower-level clauses in the grouping of lower-level clauses, wherein the Boolean operation comprises one of a Boolean AND operation and a Boolean OR operation executed between the lower-level clauses in the grouping of lower-level clauses.

11. An electronic device as in claim 10 wherein the controller runs a litigation support application which renders a litigation support graphical user interface (GUI) window on the electronic display, the litigation support GUI window including the plurality of clauses of the search query; and wherein the controller is further to:
after generating the Boolean operation between the lower-level clauses, (i) receive a search command from a user of the litigation support application and (ii) perform a search operation based on the search query having the plurality of clauses in response to the search command.

12. An electronic device as in claim 11 wherein the controller, when performing the search operation, is to:
search a collection of metadata which includes (i) intrinsic metadata relating to a set of litigation-sensitive electronic files, (ii) metadata automatically associated with the set of litigation-sensitive electronic files by the litigation support application, and (iii) metadata manually associated with the set of litigation-sensitive electronic files by the user of the litigation support application.

13. An electronic device as in claim 12 wherein the controller is to:
present a set of search results in the litigation support GUI window in response to searching the collection of metadata, the set of search results identifying particular electronic files of the set of litigation-sensitive electronic files which satisfy the plurality of clauses of the search query, the set of search results identifying at least one email message, at least one electronic text document, and at least one electronic spreadsheet of the set of litigation-sensitive electronic files.

14. An electronic device as in claim 13 wherein the set of litigation-sensitive electronic files resides on a server device; and wherein the controller is to:
after presenting the set of search results in the litigation support GUI window rendered on the electronic display, (i) receive a retrieve command from the user of the litigation support application, the retrieve command identifying a particular electronic file identified by the set of search results and (ii) retrieve content of the particular electronic file from the set of litigation-sensitive electronic files residing on the server device and displaying the content of the particular electronic file in the litigation support GUI window in response to the retrieve command.

15. The electronic device of claim 10, wherein the controller is to:
transform the particular clause into a first lower-level clause of the grouping of lower-level clauses, and
add a second lower-level clause to the grouping of lower-level clauses.

16. A non-transitory computer readable storage medium having a set of instructions stored thereon, the set of instructions, when carried out by a computer, causing the computer to:
display a plurality of clauses of a search query onto an electronic display, each clause including a field cell, an operator cell, and a selection cell, wherein the selection cell is an overloaded cell that allows selection of multiple functions;
receive a first mouse click input, from a mouse apparatus, in any location within the selection cell of a particular clause;
in response to receipt of the first mouse click input in the selection cell of the particular clause, generate a grouping of lower-level clauses for the search query;
receive a second mouse click input, from the mouse apparatus, in the selection cell of the particular clause, wherein the second mouse click input is subsequent to the first mouse click input, and wherein each of the first and second mouse click inputs is a single mouse click input in the selection cell of the particular clause; and
in response to receipt of the second mouse click input in the selection cell of the particular clause, generate a Boolean operation between the lower-level clauses in the grouping of lower-level clauses, wherein the Boolean operation comprises one of a Boolean AND operation and a Boolean OR operation.

17. The non-transitory computer readable storage medium according to claim 16, wherein the computer runs a litigation support application which renders a litigation support graphical user interface (GUI) window on the electronic display, the litigation support GUI window including the plurality of clauses of the search query; and wherein the set of instructions, when carried out by the computer, further cause the computer to:
after generating the Boolean operation between the lower-level clauses, (i) receive a search command from a user of the litigation support application and (ii) perform a search operation based on the search query having the plurality of clauses in response to the search command.

18. The non-transitory computer readable storage medium according to claim 17 wherein the set of instructions, when carried out by the computer, further cause the computer to:
search a collection of metadata which includes (i) metadata relating to a set of litigation-sensitive electronic files, (ii) metadata automatically associated with the set of litigation-sensitive electronic files by the litigation support application, and (iii) metadata manually associated with the set of litigation-sensitive electronic files by the user of the litigation support application.

19. The non-transitory computer readable storage medium according to claim 16 wherein the set of instructions, when carried out by the computer, further cause the computer to:
perform a sequence of operations in response to a series of single mouse click inputs in any location within the selection cell, the sequence of operations comprising generation of the grouping of lower-level clauses, generation of the Boolean AND operation, and generation of the Boolean OR operation.

* * * * *